(12) United States Patent
Huffman

(10) Patent No.: US 8,144,333 B2
(45) Date of Patent: Mar. 27, 2012

(54) OPTICAL FIBER STRUCTURE MONITORING AND ANALYSIS

(75) Inventor: John Sinclair Huffman, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 375 days.

(21) Appl. No.: 12/568,757

(22) Filed: Sep. 29, 2009

(65) Prior Publication Data

US 2011/0075964 A1    Mar. 31, 2011

(51) Int. Cl.
 *G01B 9/02* (2006.01)
(52) U.S. Cl. .................. 356/480; 356/519; 385/12
(58) Field of Classification Search .............. 356/480, 356/519; 385/12, 13
 See application file for complete search history.

(56) References Cited

U.S. PATENT DOCUMENTS

| | | | |
|---|---|---|---|
| 4,477,725 A | 10/1984 | Asawa et al. | |
| 4,812,645 A | 3/1989 | Griffiths | |
| 4,927,232 A | 5/1990 | Griffiths | |
| 5,026,141 A | 6/1991 | Griffiths | |
| 5,194,847 A | 3/1993 | Taylor et al. | |
| 5,649,035 A | 7/1997 | Zimmerman et al. | |
| 5,778,114 A | 7/1998 | Eslambolchi et al. | |
| 6,449,400 B1 | 9/2002 | Watanabe et al. | |
| 6,621,947 B1 | 9/2003 | Tapanes et al. | |
| 6,813,403 B2 | 11/2004 | Tennyson | |
| 7,136,156 B1 | 11/2006 | Quint | |
| 7,428,054 B2 * | 9/2008 | Yu et al. | 356/480 |
| 2008/0088846 A1 | 4/2008 | Hayward et al. | |
| 2008/0144016 A1 | 6/2008 | Lewis et al. | |

* cited by examiner

*Primary Examiner* — Kiet T Nguyen

(57) ABSTRACT

A system and method for monitoring the structural integrity of a structure is provided. An optical fiber is acoustically coupled to one or more of the structural elements. A source of optical energy is configured to inject optical energy into the optical fiber, and an optical detector is configured to detect a first optical return signal having characteristics that are affected by vibrations of the structural elements. An analyzer measures characteristics of the optical return signal to determine information concerning the movement of the structural elements monitored by the fiber optic cable. The results of the analyzer can be stored and so that the analysis of the optical return signal can be compared to previously recorded signals to determine changes in structural integrity over time. Multiple fibers can be acoustically coupled to the monitored structural elements to obtain additional data concerning the structural integrity.

19 Claims, 9 Drawing Sheets

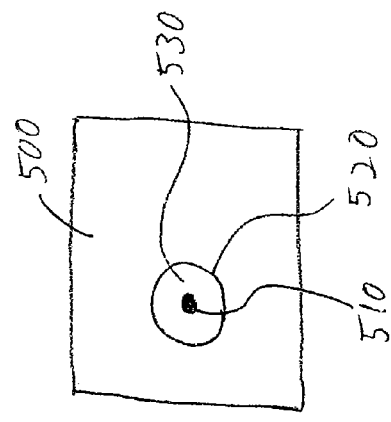
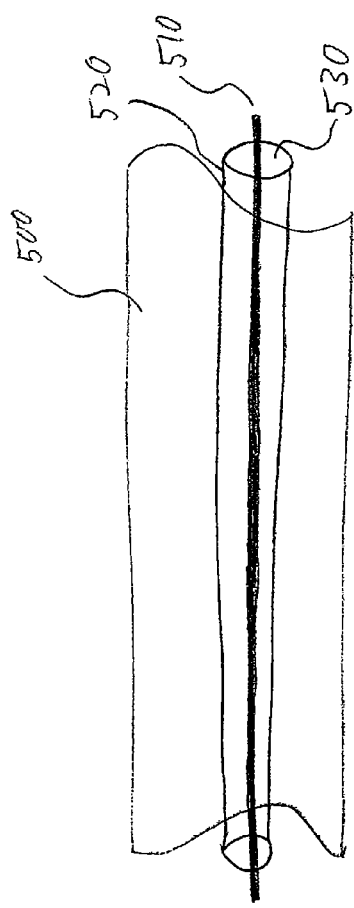
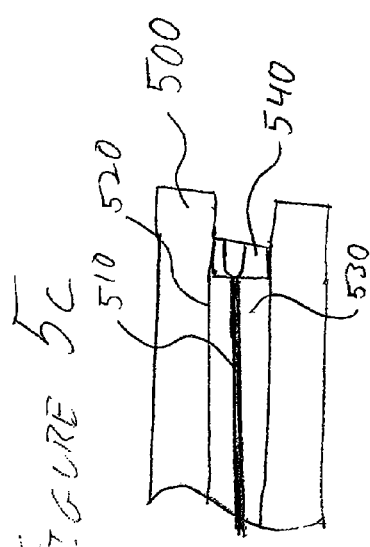

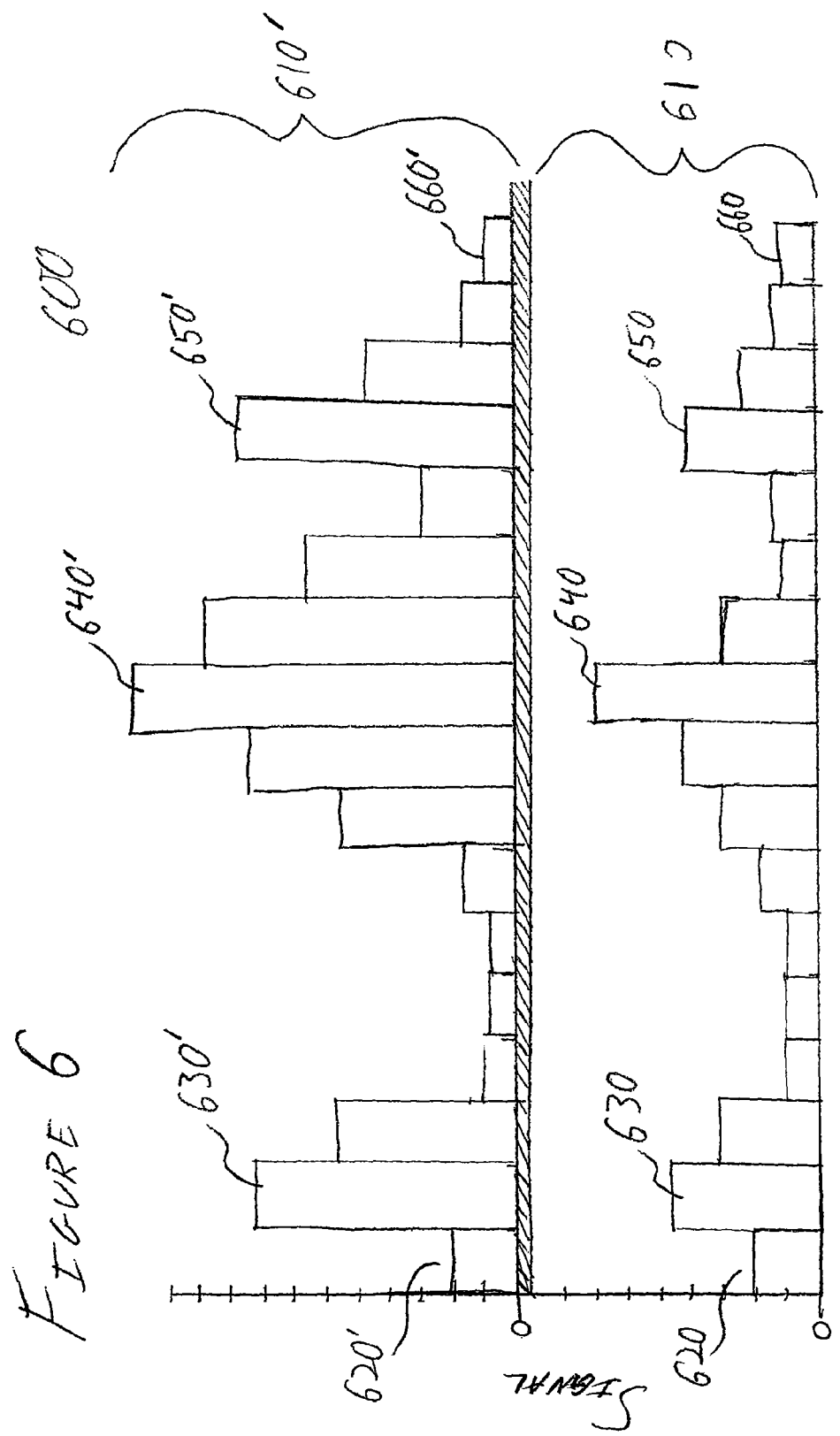

OPTICAL FIBER STRUCTURE MONITORING AND ANALYSIS

FIELD OF THE DISCLOSURE

The present disclosure relates to optical fiber surveillance systems and methods, and more particularly to methods and systems for monitoring structures and structural integrity using optical fiber surveillance systems.

BACKGROUND

As buildings, bridges and other structures age, the structural integrity of those structures begins to decline. To ensure such structures to not fail, engineers and architects incorporate a factor of safety into designs. However, a factor of safety can not prevent the gradual erosion of structural integrity that occurs over time or the impact of man-made accidents or natural disasters. Structural integrity can be monitored by measuring the deformation of movement of buildings over time. Similarly, strain and stress gages can be applied to or built into buildings. However, these measurements are limited to the specific points or elements measured and do not provide a broad and detailed view of the integrity of the entirety of the structure.

SUMMARY OF THE DISCLOSURE

In accordance with an embodiment of the present disclosure, a system for monitoring a structure having a plurality of structural elements is provided. An optical fiber is acoustically coupled to one or more of the structural elements, and a source of optical energy is configured to inject optical energy into the optical fiber. An optical detector is configured to detect an optical return signal having characteristics that are affected by vibrations of the one or more of the plurality of structural elements. An appropriately configured analyzer can then be used to analyze the characteristics of the optical return signal to determine information concerning the movement of the one or more structural elements monitored by the fiber optic cable.

In a further feature of the present disclosure, the results of the analyzer can be stored in a storage device. The analyzer can then compare information concerning the movement of the monitored structural elements to the previously recorded movements. The comparison can further be made with respect to the movement of the monitored structural elements over time based on multiple recorded previous results.

Multiple fibers can be acoustically coupled to the monitored structural elements to obtain additional data concerning the structural integrity. Each fiber can be provided with its own source of optical energy and optical detector. The analyzer can be further configured to determine information concerning the movement of the monitored structural elements based on the characteristics of the optical return signal from the additional fibers. Alternatively, a separate analyzer can be provided for each fiber.

The monitoring fibers can be coupled to the monitored structure using a gel for better transmission of vibrations. If the optical fiber is routed through a conduit, the gel can be used to fill the conduit. Alternatively, if the fiber is acoustically coupled to the exterior of the structural element, a U-channel can be used to hold the fiber in place and filled with the gel to acoustically couple the fiber to the structure.

These and other advantages of the present disclosure will be apparent to those of ordinary skill in the art by reference to the following detailed description and the accompanying drawings.

BRIEF DESCRIPTION OF THE DRAWINGS

FIG. 5A is a schematic representation of a structure in accordance with an embodiment of the present disclosure;

FIG. 5B is a schematic representation of a structure in accordance with an embodiment of the present disclosure FIG. 5C is a schematic representation of a structure in accordance with an embodiment of the present disclosure

FIG. 6 is a representation of data in accordance with an embodiment of the present disclosure;

DETAILED DESCRIPTION

Figure 1:
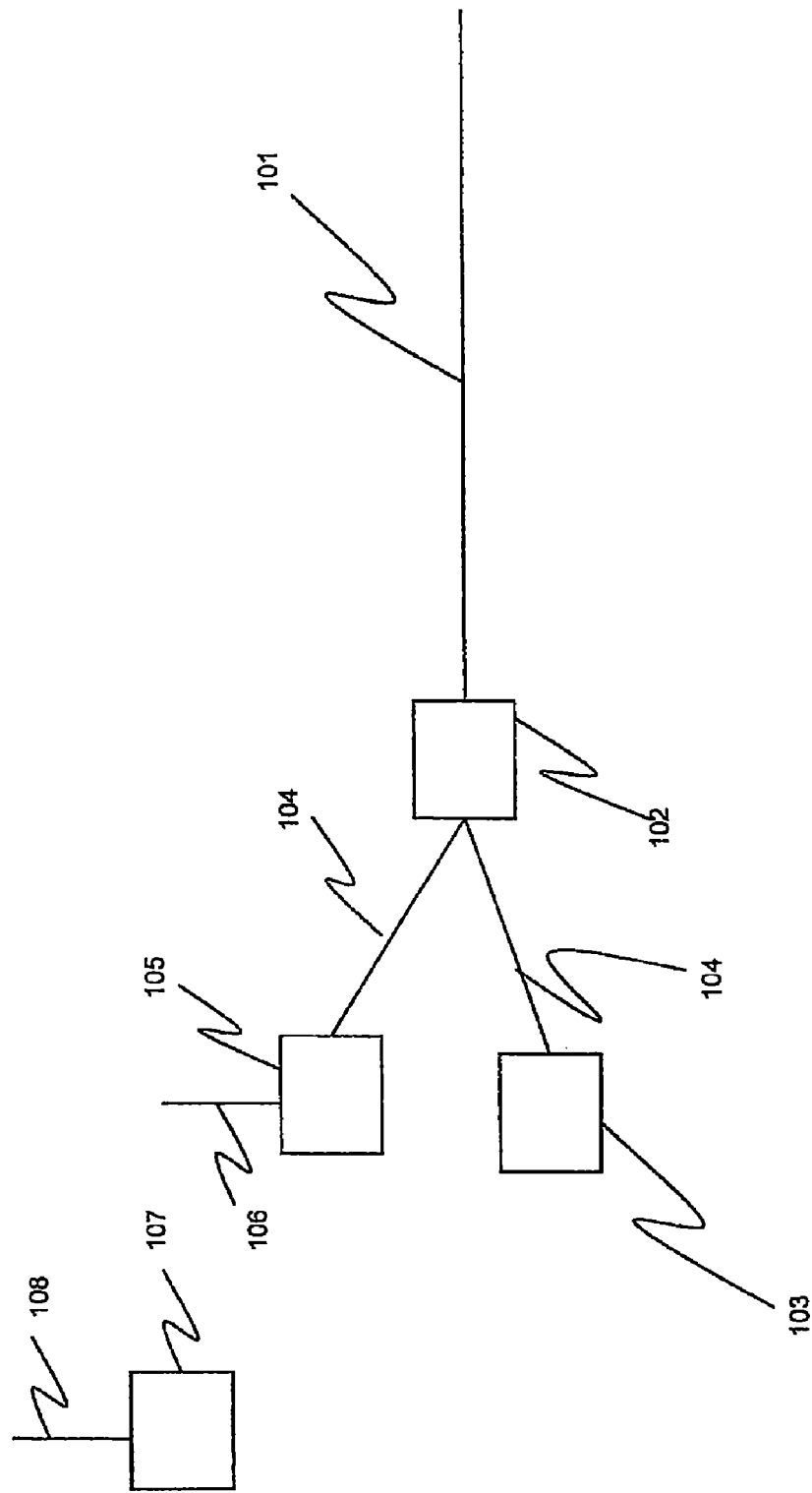
FIG. 1 is a schematic representation of an embodiment of the present disclosure.

FIG. 1 is a schematic representation of a remote fiber surveillance configuration in accordance with one embodiment of the present disclosure. In this Figure, optical energy source 103 injects optical energy into fiber 101. As would be understood by persons having ordinary skill in the art, the source 103 of optical energy can be, for example, a laser. Detector 105 detects the return signal (i.e., the "backscattered signal") emitted from the fiber in accordance with the particular technology used by the surveillance system, such as Raleigh scattering or OTDR technology. As would be understood by persons having ordinary skill in the art, the detector 105 of optical energy can be, for example, a semiconductor photo-detector. Detector 105 can also include the necessary electronics (e.g., an analyzer), such as a digital signal processor, for analyzing the return signal to determine, for example, characteristics of an exemplary acoustic signal impinging upon the fiber at some point along its length. It would be understood that the impinging signal need not be limited to acoustic signals, but can be any type of signal that will affect the return optical signal in a way that can be analyzed by the analyzer to determine characteristics of the impinging signal. Splitter/Combiner 102 injects the optical energy into the fiber and removes the return signal from the fiber. Fiber segments 104 are appropriate fiber segments for bringing the injected and return signals to source 103 and detector 105 respectively. However, the source 103 and detector 105 can be directly connected to the splitter/combiner. It would be understood by persons having ordinary skill in the art that the source 103 of the injected optical signal and the analysis instrumentalities may be included in a single structure.

In one aspect of the present disclosure, the remote fiber surveillance configuration can include a wireless transmitter 105 having an appropriate antenna 106 that transmits a signal to a wireless receiver 107 with appropriate antenna 108. Thus, the remote fiber surveillance system can be deployed in one location and monitored from a different location, optionally in real time, without requiring wired communication with the source 103 and detector 105. For example, the surveillance system could be deployed along various pipelines in Alaska and Texas, but both deployments could be monitored from a central monitoring station in Colorado. It would be understood by one having ordinary skill in the art that antennae 106 and 108, as well as the transmitter 105 and receiver 107 can be of any appropriate configuration and technology for transmitting and receiving wireless signals respectively. The wireless transmitter 105, receiver 107, and antennae 106 and 108 can involve any over-the-air transmission technology. It will be further understood that the analysis instrumentalities can be included in either transmitter 105 and/or receiver 107 and that either or both can be connected to appropriate storage media to save data prior to or after processing. The wireless transmissions can occur continuously to provide continuous monitoring or, in a "sometimes-on" embodiment, can occur periodically or at selected times In an alternative embodiment of the present disclosure, multiple fibers, such as those illustrated in FIG. 1, are deployed, each with their own instrumentalities. The instrumentalities can include networking devices that form a wireless network so that they can interact with each other to more effectively monitor the environment where they are located. Additional instrumentalities can include image equipment such as cameras to aid in the monitoring function.

Figure 2:
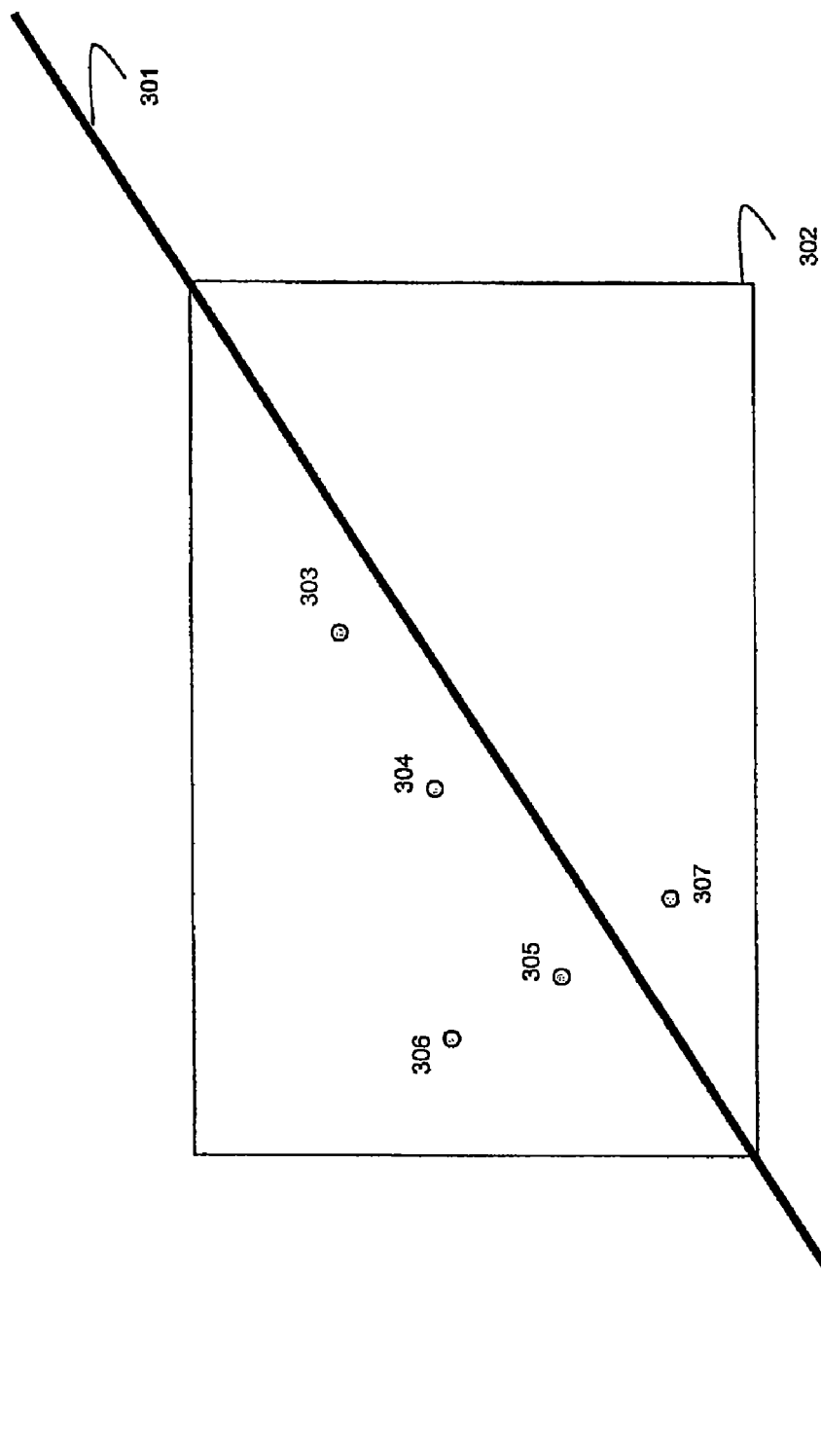
FIG. 2 is a schematic representation of an exemplary fiber topology in accordance with an embodiment of the present disclosure.

FIG. 2 is a schematic representation of a fiber that may be deployed in accordance with the present disclosure over a two dimensional area 302. Fiber 301 is shown, for simplicity, without the instrumentalities shown in FIG. 1. References 303, 304, 305, 306, and 307 (i.e., 303 through 307) are disturbances that are monitored by the fiber surveillance system. References 303 through 307 are, for example, acoustic disturbances that can be detected by the fiber surveillance system. These signals can be in the frequency range of between 20 Hz or 50 Hz on the low frequency side, and 20,000 Hz, 50,000 Hz, or 100,000 Hz on the high frequency side.

The fiber topology illustrated in FIG. 2 is substantially linear and one-dimensional. Because most fiber surveillance and/or monitoring systems locate a disturbance by its lateral distance along the fiber 301, the locations of the disturbances identified as 303, 304, and 305 can be identified and distinguished because they occur at different lateral distances along the fiber 301 (i.e., different distances along the fiber 301 from the optical energy source (not shown)). However, the location of the disturbances 305, 306, and 307 cannot be easily distinguished because they are located at the same lateral distance along the fiber, even though they are displaced perpendicularly from the fiber by different distances. Nevertheless, the locations of disturbances 305 through 307 can be distinguished using a two dimensional, overlapping topology, as discussed in greater detail below in the context of FIG. 3.

Figure 3:
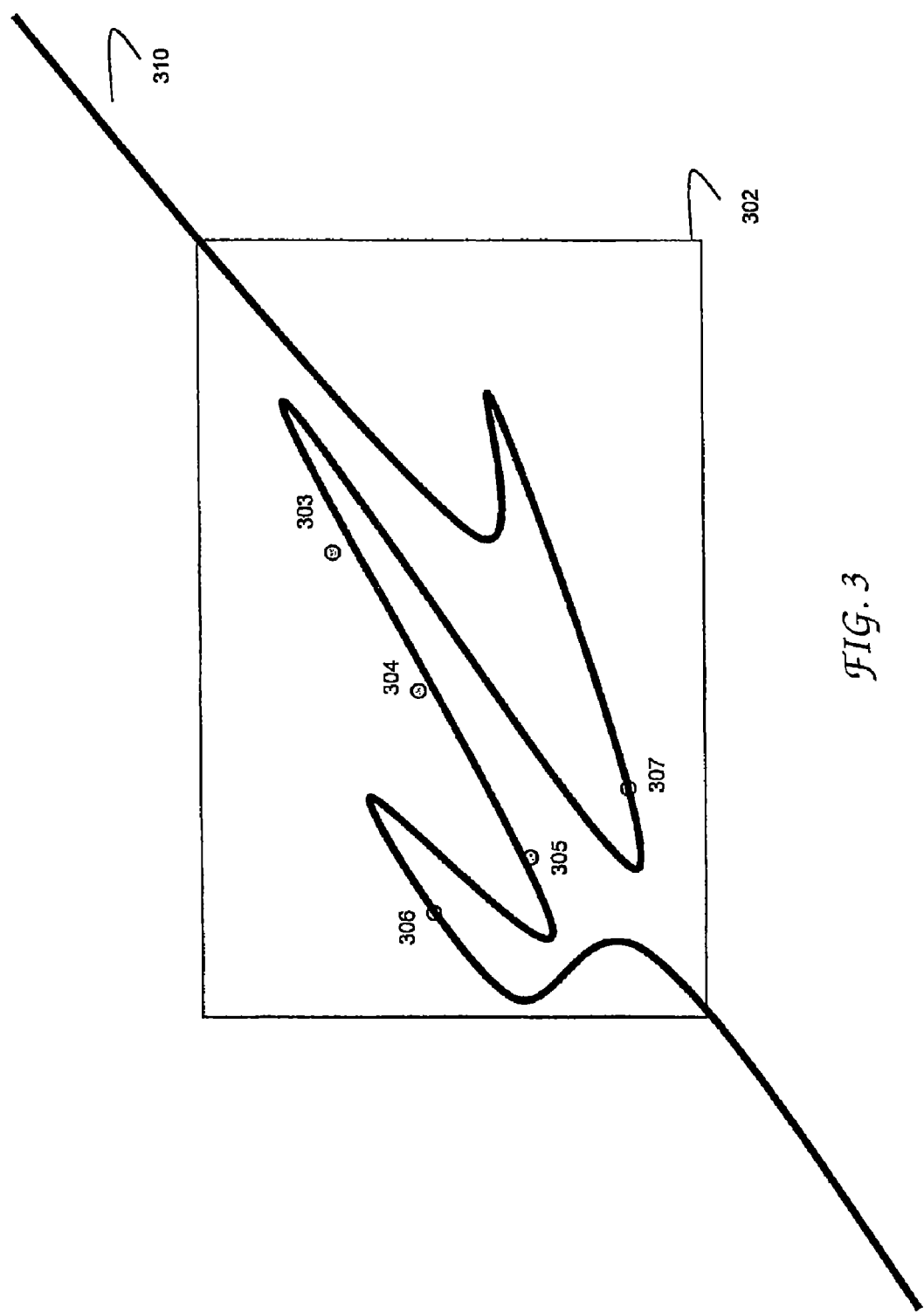
FIG. 3 is schematic representation of an alternative fiber topology in accordance with an embodiment of the present disclosure.

In the embodiment of FIG. 3, the fiber 310 is shown as having a two dimensional topology, rather than the one dimensional, linear topology of the fiber shown in FIG. 2. In this figure, items from FIG. 2 are reproduced with the same numbers. The fiber 310 meanders or serpentines over a two-dimensional surface 302. Accordingly, in this figure, even sources 305 through 307 occur at different distances along the fiber and, therefore, their spatial location can be resolved with much greater accuracy than with the topology shown in FIG. 2.

It will be noted that in the two dimensional topology of FIG. 3 there is greater fiber coverage in a given rectangular area than when the fiber is oriented in single dimensional topology of FIG. 2 (i.e., the system of FIG. 3 includes more fiber in the given area 302 than the system of FIG. 2). It would be understood that in the single dimensional topology of FIG. 2, the greatest length of fiber that can be oriented in the rectangular area 302 is equal to the largest diagonal associated with the area, as in fact is the case in FIG. 2. However, in the two dimensional fiber topology of FIG. 3, a greater length of fiber can be placed in the same rectangular area. Accordingly, in one embodiment of the present disclosure, two-dimensional topology, the length of fiber oriented in a given rectangular area is greater than the largest diagonal associated with the given area. In alternative embodiments, the length of fiber oriented in a given rectangular area is 10%, 20% or 50% greater than the largest diagonal associated with the rectangular area.

Figure 4:
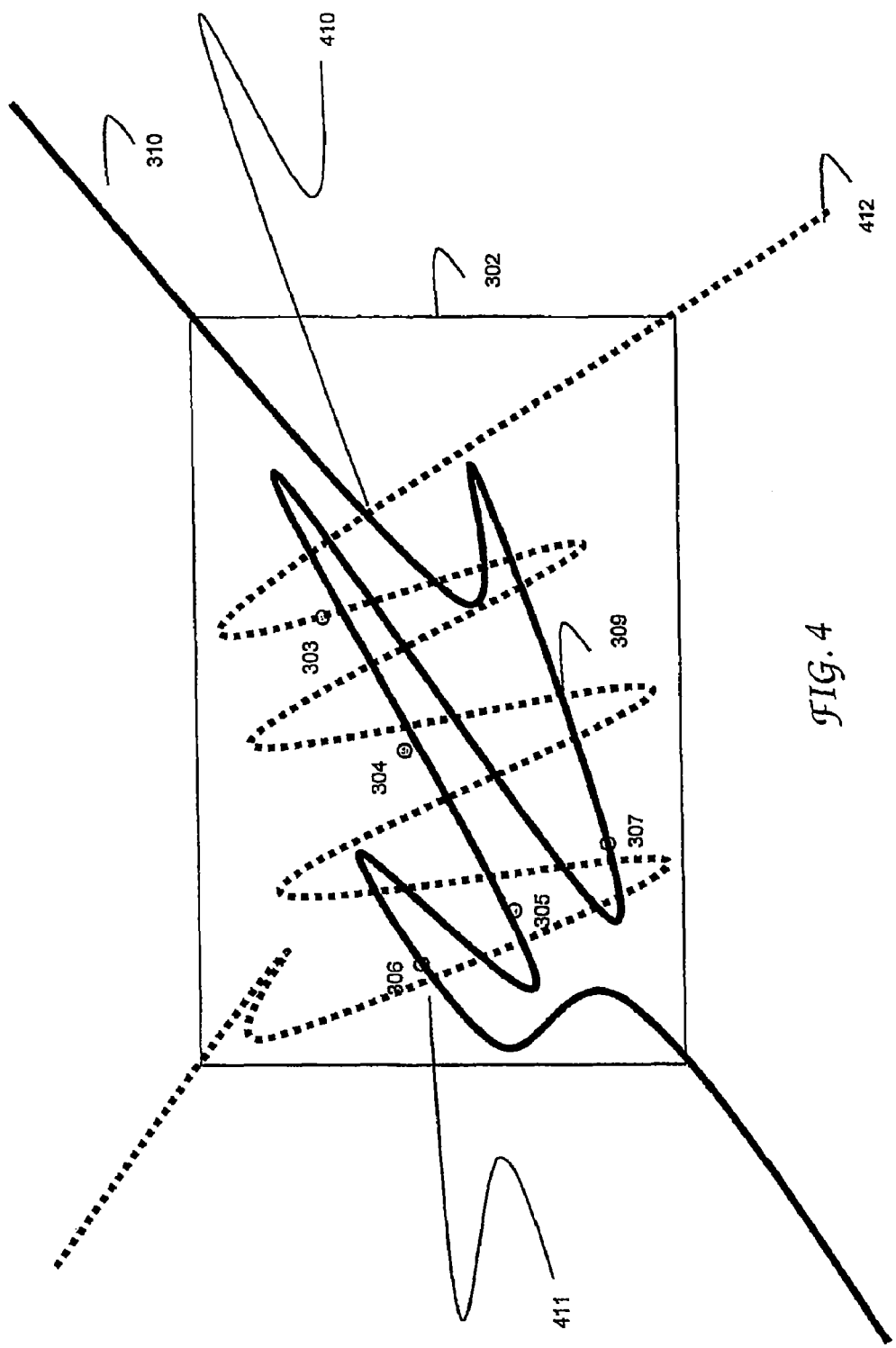
FIG. 4 is schematic representation of yet another alternative fiber topology in accordance with an embodiment of the present disclosure.

Another further application of the disclosed technology is shown in FIG. 4, in which items from FIG. 3 are reproduced with the same identifying numbers. In the topology illustrated in FIG. 4, there are two fibers 310 and 412 each of which is oriented in a two dimensional topology with the two fibers at least partially overlapping each other, with sections oriented approximately perpendicularly to each other. Each of these fibers may have its own source of optical energy, detector, and associated instrumentation as shown for example in FIG. 1. Alternatively, there may be one set of instrumentation which services both fibers.

In FIG. 4, 410 is one of the points where the two fibers overlap. In alternative applications, the fibers overlap at multiple points. It would be understood that the dual fiber topology of FIG. 4 will enable the determination of the spatial location of the various disturbances with much greater resolution because of the two dimensional nature of the topology of each fiber and the overlapping and approximately perpendicular nature of the orientation of the fibers. It will further be understood by persons having ordinary skill in the art that the degree and angle of overlap can vary over a wide range of values.

In FIG. 4, fiber 401 has overlapping points between 410 and 411. The lengths of the fibers from 410 to 411 are the portions of the fiber having overlapping points. That portion is greater, for example, than 10% of the total fiber length. It would be understood that in FIG. 4 any degree of overlap will result in a resolution improvement. While the foregoing discussion has been with reference to two fibers, it would be understood that the number of fibers can vary and any number of fibers may be used to further improve the resolution of the system.

As discussed above, many fiber surveillance technologies determine the location of the disturbance based only on the distance along the fiber of the detected disturbance. This determination is most often made by measuring signal strength as a function of distance along the fiber, as measured for example by delay between the time that the source optical signal is injected into the fiber and the time that the reflected signal is detected. However, when the orientation of the fiber is two-dimensional rather than one dimensional, the exact location (e.g., geographic location, location along a pipeline, etc.) of any point along the fiber may not be known. Accordingly, the location of a disturbance may not be determinable simply based on the distance along the fiber where the disturbance is located. Therefore, it would be advantageous to know the location of points along the fiber as a function of its distance of the points along the fiber. The location of points along the fiber can be determined by imposing a vibration or other acoustic signal at known points along the fiber. In this way, the location of the fiber can be mapped and the distance along the fiber can be associated with a specific location. Such characterization of the fiber location can be accomplished by using, for example, well-known crystal controlled vibrating rods. As the rod is moved relative to the fiber, both along the fiber and perpendicular to it, the signal will be maximum when the rod is exactly over the fiber. In this way, the fiber may be calibrated to determine the exact location of any point along the fiber.

In accordance with a further feature of the present disclosure, not only can the location of a disturbance be determined, but if the source of the disturbance moves, its location can be determined at different times. Accordingly, the path of travel and the velocity of motion, as well as other characteristics of the motion, can be determined. In alternative embodiments of the present disclosure, this information can be used to provide advanced warning not only of unauthorized activity, but of impending collisions between moving objects or between a moving a stationary objects.

In accordance with an embodiment of the present disclosure, the fiber surveillance system can be used to monitor structures, such as buildings and bridges. The disturbances discussed above result in vibrations (i.e., acoustic energy), therefore just as disturbances can be monitored by the present disclosure, vibrations within a structure or propagated by a structure can be used to monitor the structure. Furthermore, vibrations in a structure can be used to determine characteristics regarding the structural integrity of a structure. FIGS. 5A, 5B, 5C, 5D, and 5E are schematic diagrams of various embodiments of the present disclosure adapted to monitor structural components of a building or other structure. FIGS. 5A-5E use the same identifying reference numbers to identify common components.

FIG. 5A is a schematic representation of a portion of a structure 500 in accordance with an embodiment of the present disclosure. Structure 500 can be any structural element having a conduit 520 disposed through the interior of the structure 500. For example, structure 500 can include a poured concrete block, column, or wall. Alternatively, structure 500 can include a steel column or structure, wherein the conduit is a hole bored through the interior. In yet a further alternative, the conduit can be attached to the exterior of the structure 500, as described further with respect to FIG. 5D. Inside the conduit 520, is a fiber 510 having associated instrumentalities (not shown) as described above. An optical signal is injected into the fiber 510, and the return signal is detected. The return signal is characterized depending on the type of optical scattering technology being used such as Rayleigh scattering or OTDR.

During installation, fiber 510 can be blown through a section of a conduit 520 using installation techniques known to one of ordinary skill in the art. In this manner, a fiber 510 can be blown through the interior of several miles of structure 500, depending on the weight and size of the fiber cable. It would be understood by a person of ordinary skill in the art that a single fiber can be used to monitor multiple structural elements. Additionally, multiple fibers can be used to monitor a single structural element. As discussed above, multiple fibers can be installed in a structure in a mesh or other multi-dimensional layout to more precisely locate disturbances and vibrations.

In order to provide better acoustic conductivity between the fiber 510 and the structure 500, the conduit 520 is preferably filled with a gel that increases transmission of vibrational energy from the structure 500 to the fiber 510. One such gel is the "IceFree Antifreeze Gel System," manufactured by American Polywater Corporation. Liquids (e.g., water) and/or solidifying substances (i.e., materials that can be injected into the conduit as liquid and solidify over time) can be used in place of gel 530. However, gel 530 can provide the additional advantages of being selected to ensure that the substance inside the conduit does not freeze in colder weather. While the fiber could be embedded directly in a concrete structure, expansion and contraction of the concrete and/or shifting of the concrete structure can improperly attenuate the fiber 510.

FIG. 5B is a cross section of structure 500 depicted in FIG. 5A. As illustrated, structure 500 has a conduit 520 passing through the interior of the structures 500, and a fiber 510 runs through the conduit, which is preferably filled with a gel 530.

In yet a further feature of the present disclosure, and as illustrated in FIG. 5C, fiber 510 can be terminated by a connector 540 within conduit 520. The connector enables multiple spans of fiber 510 each associated with a respective section of structure 500 to be connected. Alternatively, the connector can be used to terminate the fiber 510 and connect the fiber to the necessary apparatus for injecting the optical signal and detecting the return signal.

Because the embodiments illustrated in FIGS. 5A, 5B, and 5C include a conduit 520 through the interior of the structure 500, they are typically implemented during construction of the structure 500. However, as illustrated in FIG. 5D, structures can also be retrofitted to be monitored using a fiber optic cable. For example, structure 500 of FIG. 5D is monitored by a fiber 510 acoustically coupled to the exterior of the structure 500. In order to provide better transmission of vibrations, the fiber 510 is inserted into and looped within cutouts 560 of the structure 500. The cutouts 560 can be drilled into the structure 500 or formed with the structure 500. The width of the cutouts 560 can be as small as 0.25 inches without resulting in the looped fiber being improperly attenuated. The fiber 510 is preferably held between a cover 550 such as a U-channel and the exterior of the structure 500, and a gel 530 is inserted within the cavity between the cover 550 and the structure 500 to improve transmission of vibrations to the fiber 510.

Figure 5E:
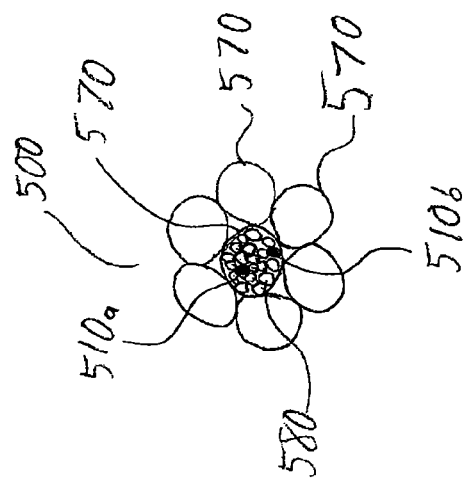
FIG. 5E is a schematic representation of a structure in accordance with an embodiment of the present disclosure.
Figure 5D:
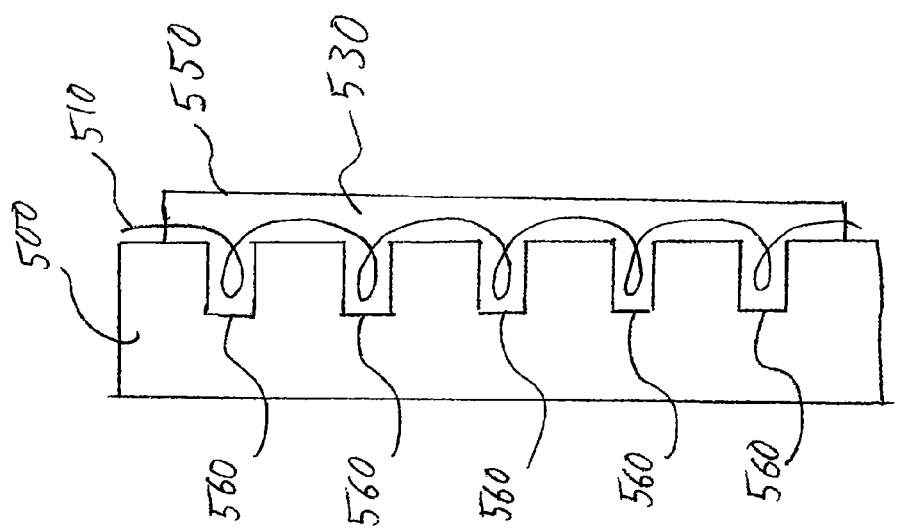
FIG. 5D is a schematic representation of a structure in accordance with an embodiment of the present disclosure.

FIG. 5E illustrates yet another structure 500 that can be monitored using the present disclosure. The structure 500 of FIG. 5E is a wound load bearing cable, such as the type that might be used in a bridge or an elevator. The load bearing cable (i.e., structure 500) is composed of one or more stranded cables 570. Each stranded cable 570 includes multiple wire strands 580. One or more fibers 510a and 510b can be wound with the other strands 580 to form a stranded cable 570. Because the strands 580 and tightly wound and compressed, as are stranded cables 570, vibrations are propagated to fibers 510a and 510b. Additionally, the attenuation of the fibers 510a and 510b can also be measured to determine stress within the structure 500.

Structural integrity (e.g., as measured by stress, strain, shear, movement, vibrations, etc) in a structure can be monitored over time. That is, the current signal from the monitoring optical fiber can be compared to one or more previous signals to determine which components are experience undesirable or decreased structural integrity. FIG. 6 illustrates a side-by-side comparison 600 of a baseline histogram 610 and a current histogram 610' of the signal from a fiber optic cable deployed to monitor structural integrity in accordance with an embodiment of the present disclosure.

The x-axis of histograms 610 and 610' represents the distance along the length of the fiber which can be measure as described above with reference to FIGS. 1-4. The distance along the length of the fiber can be correlated with particular sections or components of the structure being monitored. In accordance with one embodiment, approximately 25 miles of fiber can be monitored in independent increments of about 20 meters. In accordance with a further embodiment, approximately 3 to 4 miles of fiber can be monitored in independent increments of about 5 meters. Additional embodiments provide for various lengths of fiber and a range of incremental spans of fiber.

The y-axis of histograms 610 and 610' represent a characteristic of the signal received from the fiber optic cable. The characteristics can include amplitude, phase-shift, signal beat phase, frequency, and other known properties. For illustrative purposes, the y-axis of FIG. 6 will be discussed with respect to a measure of amplitude of the return signal from the fiber optical cable.

The baseline histogram 610 can be determined in a number of ways. It can represent a measure of the signal characteristic after initial installation or an average over a time period after installation. Alternatively, the baseline histogram 610 can be a sample or average that was measured over a predetermined past time (e.g., an average over a month as measured six months ago). In yet a further alternative, the baseline histogram 610 can be a moving average of the most recent measurements. Other known measures of sampling can also be used.

Each bar of the current histogram 610' can be compared to the corresponding bar of the baseline histogram 610. As illustrated, a comparison of the histograms 610 and 610' show that the signal from the fiber segment corresponding to section 620 and 620' has remained relatively constant. Similarly, the signal from the fiber segment corresponding to section 660 and 660' has remained relatively constant. In contrast, the signal from the fiber segments corresponding to sections 630 and 630', 640 and 640', and 650 and 650' have increase as compare to their respective baselines. This increase can indicate a decrease in structural integrity of the building corresponding to those fiber segments.

Figure 7:
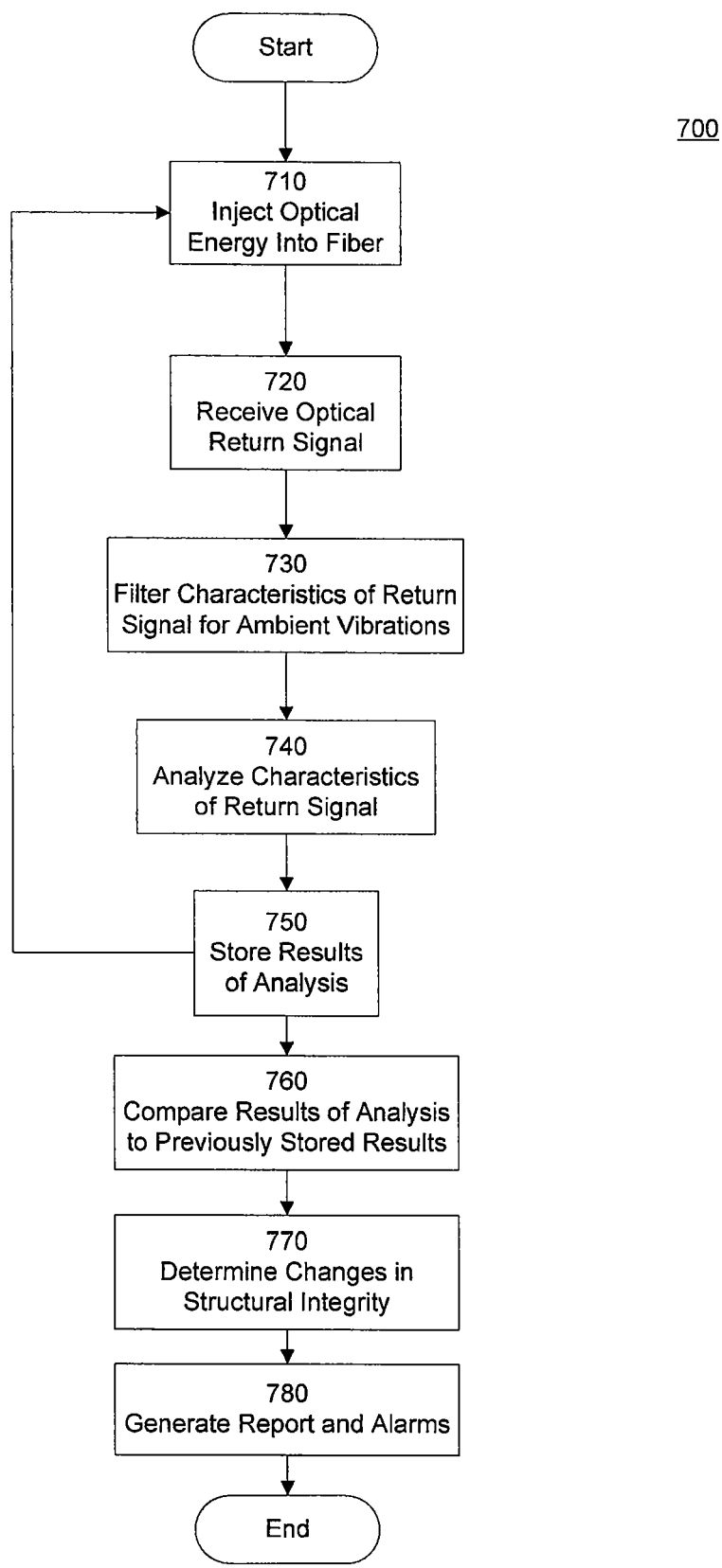
FIG. 7 is a schematic representation of an exemplary methodology for use in accordance with an embodiment of the present disclosure.

FIG. 7 illustrates a process 700 for use with the fiber optic structural monitoring apparatus described above. At step 710, optical energy injected into the optical fiber being used to monitor structural integrity, and at step 720, the optical return signal is received. Optionally, at step 730, the signal can be filtered to account for ambient vibrations. For example, wind or heavy vehicles passing by a building or bridge can cause various structures to vibrate. At step 730, these vibrations can be accounted for and filtered from the received signal.

At step 740, the return signal is analyzed to determine the various characteristics that can be used to detect vibrations and movement, as described herein. The results of the analysis can be stored at step 750. The stored results can optionally be incorporated into the baseline measurements used for comparison (e.g., the baseline histogram 610'). The process 700 preferably continues to gather data regarding structure integrity and returns to step 710 to repeat steps 710-750.

At step 760, the results of the analysis at step 750 are compared to the previously stored results. One example of this comparison is illustrated above with respect to FIG. 6. Additional analysis and comparison can be performed to determine signal trends either over time or between spans of the fiber optic cable. Based on this comparison, changes in the structural integrity of the monitored structure are determined at step 770. At step 780, a report can be generated identifying the changes in the structural integrity. If necessary, alerts/alarms can be generated at step 780 to bring attention to any changes in structural integrity that require immediate attention.

Figure 8:
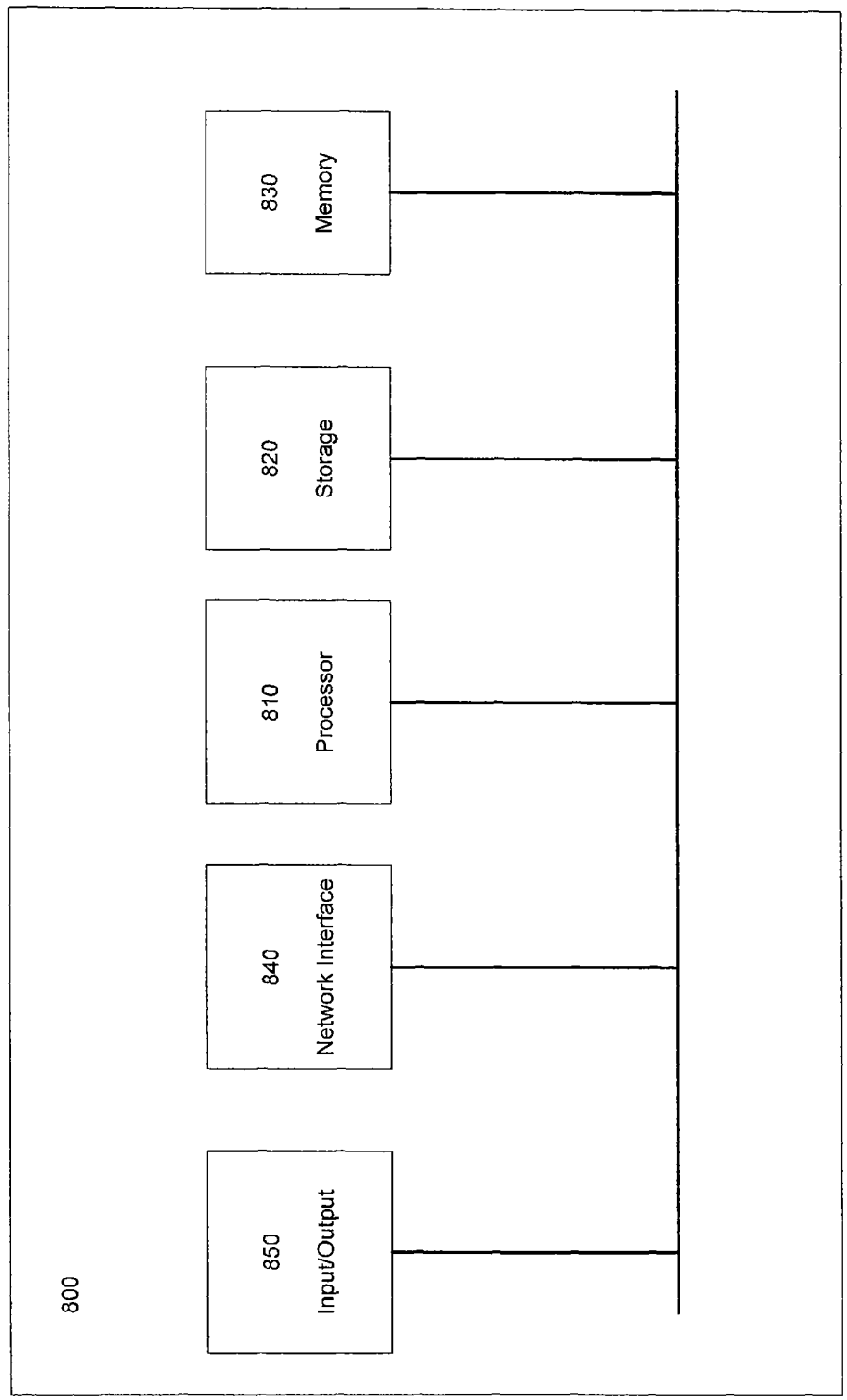
FIG. 8 is a schematic representation of a computer that may be used to implement methodologies in accordance with the present disclosure.

A high-level block diagram of a computer that may be used to implement the methodology of FIG. 7 is illustrated in FIG. 8. Computer 800 contains a processor 810 which controls the overall operation of the computer 800 by executing computer program instructions which define such operation and implement the methodology of FIG. 6. The computer program instructions may be stored in a storage device 820, or other computer readable medium (e.g., magnetic disk, CD ROM, etc.), and loaded into memory 830 when execution of the computer program instructions is desired. Thus, the method steps of FIG. 6 can be defined by the computer program instructions stored in the memory 830 and/or storage 820 and controlled by the processor 810 executing the computer program instructions. For example, the computer program instructions can be implemented as computer executable code programmed by one skilled in the art to perform an algorithm defined by the method steps of FIG. 6. Accordingly, by executing the computer program instructions, the processor 810 executes an algorithm defined by the method steps of FIG. 7. The computer 800 also includes one or more network interfaces 840 for communicating with other devices via a network. The computer 800 also includes input/output devices 850 (e.g., display, keyboard, mouse, speakers, buttons, etc.) that enable user interaction with the computer 800. One skilled in the art will recognize that an implementation of an actual computer could contain other components as well, and that FIG. 8 is a high level representation of some of the components of such a computer for illustrative purposes It would be understood by those having ordinary skill in the art that the present disclosure can be implemented with any appropriate optical scattering technique, including but not limited to Raleigh scattering and OTDR, and/or any optical signal analysis technique useful in optical surveillance systems As discussed above, optical pulses can be launched into a buried optical fiber and the signal backscattered by the fiber can be detected. The optical frequency of one pulse within a pair of pulses differs slightly from the optical frequency of the other pulse within the pair of pulses. This frequency difference (or separation) itself varies from one pair of pulses to the next. This variation in frequency difference results in a detected backscattered signal having a phase that is modulated by an acoustic signal in the vicinity of the fiber, allowing decoding of the disturbance with improved signal to noise ratio, reduced fading and a linear output.

In the present disclosure, the following definitions apply: The pulses may be considered as individual pulses, pairs of pulses or groups of pulses; The term "launching" includes introducing the pulse into the fiber or transmitting the pulse in the fiber; The term "optical" as used herein may refer to the region of the electromagnetic spectrum that is visible, generally considered to be between approximately 380 nm and 760 nm. However, depending on the application, the term "optical" as used herein can extend into what is sometimes referred to as the infrared and ultraviolet range of the spectrum, for example from 200 nm to 5,000 nm, or 10 nm to 100,000 nm. In any event, the term "optical" will apply to any frequency which is used to transmit data or voice in or through optical fibers; and while the discussion is in terms of an optical fiber, in alternative embodiments pulses outside the optical spectrum may be launched into any appropriate medium that will transmit the pulses.

Where the pulses are 20 meters wide, the frequency difference is on the order of 5 MHz and varies by about 5 MHz from one pulse pair to the next. In alternative embodiments, the frequency difference can range from approximately 1 MHz to approximately 5 MHz. For these parameters, each pulse pair results in independent scattering, yielding improved signal to noise ratio. These parameters also result in a relative phase shift of the interference between pulses within each pulse pair on the order of Pi, yielding reduced fading if multiple pulse pairs are used. (Note that it is possible to detect the scattering of each pulse pair from the same section of fiber to within the spatial width of the pulse.)

Both the amplitude and the phase of the beat signal are affected by acoustic disturbances that may be present in the vicinity of the fiber. In one embodiment, the amplitude and phase is extracted from the scattered signal using known complex demodulation techniques. Demodulation is performed at the known frequency difference between pulses in a pair. Such demodulation may be performed by multiplying the reflected signal at the difference frequency by the sine and cosine of the difference frequency. This results in both sinusoidal components and a DC component. For a specific embodiment, a low pass filter with cut-off frequency in the vicinity of 5 MHz isolates the DC component. (Note that if this low pass filter is too narrow it will blur the spatial resolution of the result and if it is too broad it will include the results from the next pair of pulses that may be separated by about 10 MHz yielding a result that is not independent.) The DC component reflects the phase and amplitude of the scattered signal. Rectangular to polar conversion enables the independent determination of the phase and amplitude. The phase will drift relative to the local demodulating signal because of small, slow-varying, changes in environmental parameters. Accordingly, to remove this drift, a high pass filter is used on the phase signal after the rectangular to polar conversion. In this way, only the acoustic signal is observed. Detection techniques that only measure the amplitude suffer from low signal to noise ratio, fading and nonlinearity. The present disclosure, by using pulse pairs with appropriate frequency spacing and by analyzing the phase of the scattered beat signal, results in improved signal to noise ratio, reduced fading, and an output that is linear over a larger dynamic range.

The discussion to this point has focused on a single pulse pair that is transmitted through the fiber. If, for this single pulse pair, we want to look at every 20 meters of fiber, we sample accordingly in time, knowing the time of launch. In analyzing the results, N analysis "bins" may be used, one bin for each 20 meter section of fiber. When multiple pulse pairs are used at some pulse repetition rate then for each bin data will arrive at the pulse repetition rate. A filter is applied to limit the signal to the acoustic band of interest—usually between 1 Hz and 200 Hz for acoustic coupling through the ground or other solid structure. A low pulse repetition frequency limits the maximum acoustic frequency that can be detected without aliasing. A given frequency difference cannot be reused in a second pulse pair until we have observed all of the backscattering from that frequency difference. Accordingly, a given frequency difference cannot be reused until the round trip time within the cable passes. A 2.5 kHz pulse repetition rate is compatible with a cable length of about 25 miles.

There is still an amplitude variation in the observed signal and if the amplitude gets too low, the signal to noise ratio is poor. In those circumstances, the low amplitude result may be disregarded or given low weight. Additionally, a phase unwrap algorithm may be used to obtain greater dynamic range. Because of the discontinuity in arctan as the phase exceeds the range −Pi to +Pi, it is advantageous to add the results at the discontinuity to remove that artifact. If there is no acoustic disturbance, there is no change in the phase and amplitude. If there is an acoustic disturbance, it results in very small local changes in fiber length and a linear change in the phase reflecting linear strain in the fiber.

The duty cycle may be improved by launching pulse pairs with different frequency deltas for the various pulse pairs. In this way, multiple pairs may be propagated in the fiber at one time and their signals can be differentiated by observing the appropriate deltas. The analysis for a second pulse pair is the same as that described above for the first pulse pair except that the demodulating frequency is the new delta. After the high pass filtered phase result is obtained, it is combined with the appropriate bin from the previous pulse—using a time shift reflecting the time difference between the first and second pulse pair. The resultant acoustic signals will add coherently. That is, if the acoustic signal is varying, the detected variation between the first and second pulse pairs will be in phase and add constructively resulting in improved signal to noise ratio. Additionally, if one of the results for the first pulse pair is faded or has low amplitude, the results for the second pulse pair is highly unlikely to show similar effects because of the pi shift in the deltas.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the invention. Those skilled in the art could implement various other feature combinations without departing from the scope and spirit of the invention.

I claim:

1. A system for monitoring a structure having a plurality of structural elements, the system comprising:
   a first optical fiber acoustically coupled via a gel to at least one of the plurality of structural elements;
   a first source of optical energy configured to inject optical energy into the first optical fiber;
   a first optical detector configured to detect a first optical return signal having characteristics determined at least in part by vibrations of the at least one of the plurality of structural elements;
   an analyzer configured to determine a first information concerning a structural integrity of the at least one of the plurality of structural elements based at least on a comparison of the characteristics of the first optical return signal to a plurality of known optical return signal characteristics.

2. The system of claim 1, further comprising:
   a storage device storing the characteristics of a plurality of previous optical return signals detected by the first optical detector,
   wherein the known optical return signal characteristics include the stored characteristics of the plurality of previous optical return signals.

3. The system of claim 1, further comprising:
   a second fiber acoustically coupled via the gel to at least one of the plurality of structural elements;
   a second source of optical energy configured to inject optical energy into the second optical fiber; and
   a second optical detector configured to detect a second optical return signal having characteristics determined at least in part by vibrations of the at least one of the plurality of structural elements;
wherein the analyzer is further configured to determine a second information concerning the structural integrity of the plurality of structural elements based at least on a comparison of the characteristics of the second optical return signal to the plurality of known optical return signal characteristics.

4. The system of claim 1, further comprising a conduit coupled to the at least one of the plurality of structural elements, wherein the first optical fiber is routed through the conduit.

5. The system of claim 4, wherein the gel substantially fills a space between the first optical fiber and the conduit.

6. The system of claim 4, wherein the conduit is at least partially contained within the at least one of the plurality of structural elements.

7. The system of claim 4, wherein the conduit is at least partially coupled to an exterior of the at least one of the plurality of structural elements.

8. The system of claim 1, wherein the analyzer is further configured to filter characteristics of the first optical return signal caused by ambient vibrations.

9. The system of claim 1, wherein the structure comprises at least one of a building and a bridge.

10. A method for monitoring a structure having a plurality of structural elements, the method comprising:
injecting optical energy into a first optical fiber acoustically coupled via a gel to at least one of the plurality of structural elements;
receiving from the first optical fiber a first optical return signal having characteristics determined at least in part by vibrations of the at least one of the plurality of structural elements;
comparing the characteristics of the first optical return signal to a plurality of known optical return signal characteristics; and
determining a first information concerning the structural integrity of the at least one of the plurality of structural elements based at least on a result of the comparison of the first optical return signal and the plurality of known optical return signal characteristics.

11. The method of claim 10, further comprising:
storing the characteristics of a plurality of previous optical return signals received,
wherein the known optical return signal characteristics include the stored characteristics of the plurality of previous optical return signals.

12. The method of claim 10, further comprising:
injecting optical energy into a second optical fiber acoustically coupled via the gel to at least one of the plurality of structural elements;
receiving from the second optical fiber a second optical return signal having characteristics determined at least in part by vibrations of the at least one of the plurality of structural elements;
comparing the characteristics of the second optical return signal to the plurality of known optical return signal characteristics; and
determining a second information concerning the structural integrity of the at least one of the plurality of structural elements based at least on a result of the comparison of the second optical return signal and the plurality of known optical return signal characteristics.

13. The method of claim 10, further comprising applying the gel to the first optical fiber so as to acoustically couple the first optical fiber and the at least one of the plurality of structural elements.

14. The method of claim 10, further comprising routing the first optical fiber through a conduit coupled to the at least one of the plurality of structural elements.

15. The method of claim 14, further comprising filling the space between the first optical fiber and the conduit with the gel.

16. The method of claim 14, wherein the conduit is at least partially contained within the at least one of the plurality of structural elements.

17. The method of claim 14, wherein the conduit is at least partially coupled to an exterior of the at least one of the plurality of structural elements.

18. The method of claim 10, further comprising filtering characteristics of the first optical return signal caused by ambient vibrations.

19. The method of claim 10, wherein the structure comprises at least one of a building and a bridge.

* * * * *